United States Patent [19]

Winchester

[11] Patent Number: 4,675,257
[45] Date of Patent: Jun. 23, 1987

[54] IRON-LITHIUM ANODE FOR THERMAL BATTERY

[75] Inventor: Clinton S. Winchester, Severna Park, Md.

[73] Assignee: Mine Safety Appliances Company, Pittsburgh, Pa.

[21] Appl. No.: 554,005

[22] Filed: Nov. 21, 1983

Related U.S. Application Data

[63] Continuation-in-part of Ser. No. 444,968, Nov. 29, 1982, abandoned.

[51] Int. Cl.$^4$ .......................... H01M 4/40; H01M 6/36
[52] U.S. Cl. ...................................... 429/112; 429/218
[58] Field of Search ............... 429/101, 102, 103, 218, 429/112

[56] References Cited

U.S. PATENT DOCUMENTS

| | | | |
|---|---|---|---|
| 3,930,888 | 1/1976 | Bowser et al. | 429/218 |
| 4,044,192 | 8/1977 | Bowser, Jr. et al. | 429/112 |
| 4,061,841 | 12/1977 | Sharma et al. | 429/112 |
| 4,119,769 | 10/1978 | Schneider et al. | 429/102 |
| 4,221,849 | 9/1980 | Harney | 429/218 |

*Primary Examiner*—Donald L. Walton
*Attorney, Agent, or Firm*—Reed Smith Shaw & McClay

[57] ABSTRACT

An improved lithium anode for thermal batteries wherein a metal screen is positioned between and substantially co-extensive with an anode composite comprising lithium and a particulate metal and a metal collector or cup positioned in contact with said composite.

8 Claims, 13 Drawing Figures

4,675,257

IRON-LITHIUM ANODE FOR THERMAL BATTERY

PRIOR APPLICATIONS

This is a continuation-in-part application of Ser. No. 444,968 filed Nov. 29, 1982, now abandoned.

BACKGROUND OF THE INVENTION

The present invention is an improvement in the iron-lithium anode disclosed in U.S. Pat. No. 4,221,849. Thermal batteries typically comprise a plurality of thermal cells each of which includes an anode, cathode, electrolyte and an integral ignitable heat source. The electrolyte is usually an eutectic mixture of LiCl and KCl and the cathode (depolarizer) normally comprises materials which are reduced in the electrochemical cell such as phosphates, metal oxides, borates and chromates. Examples of typical thermal cells are disclosed and taught in U.S. Pat. Nos. 3,677,822; 3,425,872; 3,527,615; 3,367,800; 3,891,460; 3,930,888 and 4,119,769. The latter patent, U.S. Pat. No. 4,119,769 teaches the use of a mixture of iron pyrite and binder as a depolarizer which has significant advantages over the conventional depolarizer materials of calcium chromate or vanadium pentoxide. U.S. Pat. No. 4,044,192 discloses a thermal battery having a central opening filled with a solid fuse material.

U.S. Pat. No. 4,221,849, discloses a further improvement in thermal batteries in which the anode comprises a pyrometallurically combined iron-lithium having a ratio of lithium to iron of about 15% to 35%. In those preferred ratios, the iron particles are held together by the surface tension of the lithium rather than being alloyed thereto. Typically, only about 20% by weight of the anode is lithium; however, the material retains the essential characteristics of lithium and is easily rolled and shaped. The present invention utilizes the improvement in the anode material of U.S. Pat. No. 4,221,849.

Thermal batteries are constructed by placing the iron-lithium anode in a metal cup such that the anode contacts the base thereof. The cup-anode assembly also includes an insulator, normally made by Fiberfrax ®, which is positioned in the cup and against the anode to act as a separator between the two-layered depolarizer (preferably comprising an anolyte layer and a catholyte layer) and the anode. Adjacent to the depolarizer is positioned an ignitable heat source. Each anode, depolarizer, ignitable heat source comprise a unit, a large number of which are positioned in a stack array to produce a thermal battery.

It has been found that upon activation of these batteries that noise of a few seconds duration, with peak to peak values of greater than ½ volt between 3 and 15 KHz are exhibited. This noise was greatly exaggerated on cold conditioned batteries relative to hot conditioned batteries. In many cases, the low level, high frequency noise is construed as a failure mode of the battery during sampling resulting in the rejection of otherwise good batteries. Furhter, such noise has been found to seriously degrade the final activation rate of the thermal battery. Accordingly, it is an object of the present invention to provide a noise-free activation of thermal batteries over a fairly large temperature rage as well as to enhance the iron-lithium anode electrical contact. In addition, it is an object of the present invention to afford greater utilization of the anode as well as the cathode material and to provide lower resistance battery operation.

DESCRIPTION OF THE INVENTION

Generally, the anode of the present invention comprises a metal cup containing lithium and a particulate metal capable of being wetted by molten lithium but which is only slightly or not at all alloyable with said lithium and a metal screen interposed between the metal cup and anode composite material. Prior to the present invention attempts were made by the inventor to utilize a screen positioned on top of the anode composite material to achieve decreased activation noise. These attempts provided lowered noise level advantages due to the limited initial surface contact between the anode material and the eutectic electrolyte. It was unexpectedly discovered in the present invention, however, that by positioning a metal screen between the metal cup and anode composite material, together with removal of the fiberfrax separator, not only was the reduction and elimination of activation noise maintained but substantially improved electrical characteristics were achieved. It is believed that noise-free operation and almost noise-free activation in the batteries of this invention is due to expansion space provided by the metal screen.

It was also found that a center opening could be advantageously used. The central opening can be filled with a solid or central fuse to speed ignition and facilitate handling of the cells during fabrication. Furthermore, the metal cup may be dispensed with when using the screen. Other advantages of the present invention will become apparent upon perusal of the following more detailed description of the invention taken in connection with the accompanying drawings.

PREFERRED EMBODIMENT

Figure 1:
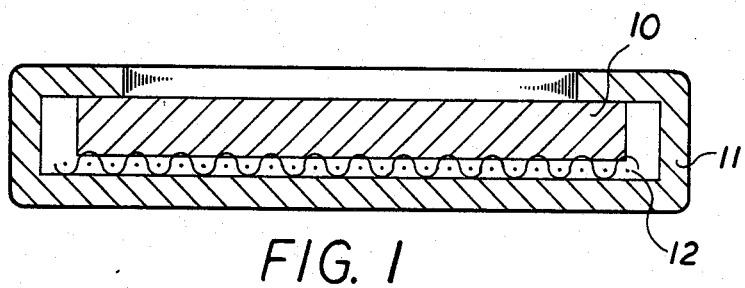
FIG. 1 is a sectional elevation of the iron-lithium anode, screen and cup of the present invention.
Figure 2:
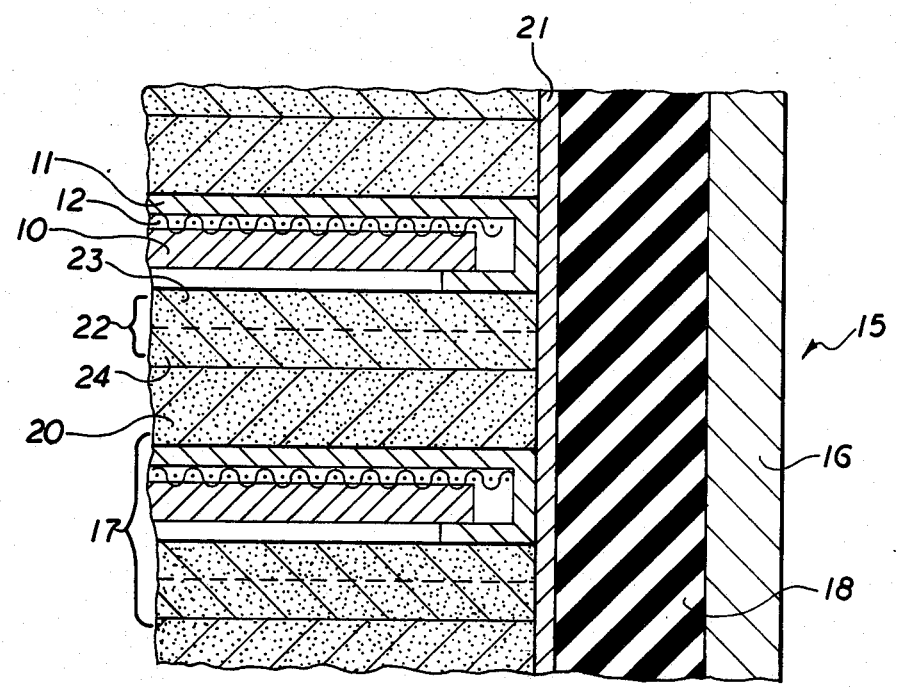
FIG. 2 is an enlarged breakaway sectional elevation of the anode of the present invention positioned in a stack array for use in a thermal battery such as that disclosed in U.S. Pat. No. 4,221,849.

With respect to FIG. 1, an iron-lithium anode disc 10, made in accordance with teachings of U.S. Pat. No. 4,221,849, incorporated herein by reference, is positioned in a metal cup 11. In addition to the use of particulate iron in anode disc 10, particulate stainless steel, nickel and nickelchrome can be used. Preferably, the particulate metal is present in an amount of 70% to 85% by weight. A stainless steel disc screen 12 is interpositioned between cup 11 and anode disc 10. Preferably screen 12 is an expanded metal mesh similar to Dekler 5Fe7-077 or 3Fe7-077. Alternatively, screen 12 could be integrally molded with anode disc 10 and positioned therein so as to make contact with the base of metal cup 11 as shown in FIG. 1.

Figure 1A:
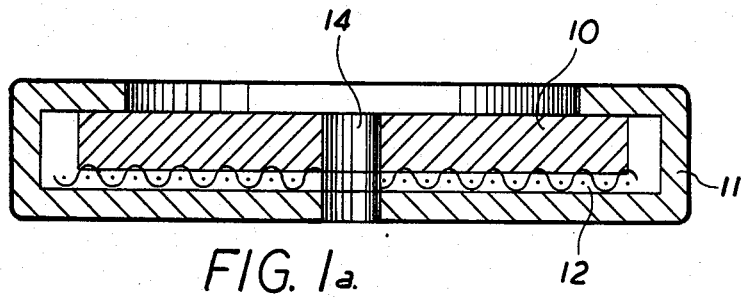
FIG. 1a is a sectional elevation of the iron-lithium anode, screen and cup as in FIG. 1, but in which a center opening is used.
Figure 1B:
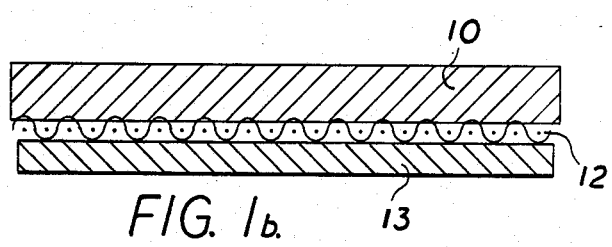
FIG. 1b is a sectional elevation in which the metal cup shown in FIG. 1 was removed.
Figure 1C:
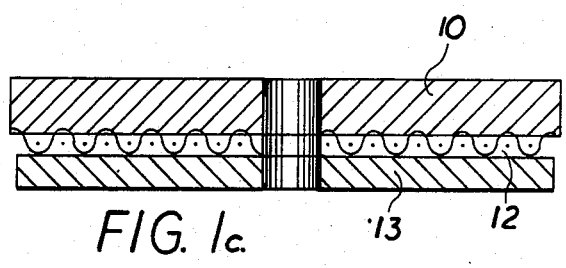
FIG. 1c is a sectional elevation in which the metal cup shown in FIG. 1b was removed.

In FIG. 1a, central opening 14 is provided which may be filled with a solid fuse not shown. In FIGS. 1b and 1c, metal cup 11 was eliminated and a metal collector disc 13 used without and with center opening 14; respectively.

A thermal battery 15 typically utilizes a plurality of iron-lithium anodes and depolarizers in a stacked array which is housed in metal housing 16, usually of a cylindrical configuration. Each of the electrochemical cells 17 which are positioned in stack array are separated from housing 16 by means of thermal and electrical insulation 18. Depolarizer 22 preferably consists of an anolyte layer 23 and a catholyte layer 24.

The preferred anolyte layer 23 comprises a mixture of LiCl (45%) and KCl (55%) eutectic which is blended with magnesium oxide in a ratio of 1 to 1 and fused at a temperature of from 380° to 395° C. for about 16 hours. The catholyte layer 24, on the other hand, comprises 25% (by weight) electrolyte binder mix (LiCl-KCl eutectic) and 75% iron pyrite, as more fully disclosed in U.S. Pat. Nos. 4,221,849 and 4,119,769. Completing each cell is an ignitable chemical heat source 20 which is ignited by fuse strip 21 which is in turn connected to an electrical match or squib (not shown) to activate the battery.

Batteries 15 made in accordance with the present invention exhibit greatly reduced activation noise. To demonstrate the unexpected improvement batteries of the prior art made in which the screen was positioned between the anode and electrolyte as described in Example 1 and compared to batteries 15 made in accordance with Example 2.

EXAMPLE 1 (PRIOR ART)

Batteries comprising 27 cells 17 were assembled in accordance with U.S. Pat. No. 4,221,849 except that a screen similar to screen 12 of the present invention was substituted for the insulating (fiberfrax) ring of the patent and positioned between the anode and depolarizer.

EXAMPLE 2 (PRESENT INVENTION)

Batteries 15 of the present invention comprising 27 cells 17 were assembled in accordance with U.S. Pat. No. 4,221,849 except no insulating ring was used and screen 12 was positioned as shown in FIG. 1.

COMPARISON OF DISCHARGE GRAPHS (FIGS. 3-10)

Test procedure: Discharges were made of eight batteries which consisted of two matched sets of four units made in accordance with Example 1 and 2. In each set of four, two units were discharged after temperature conditioning at −31.6° C. (−25° F.) and two at 60° C. (+140° F.). During the 40 second test period, three discrete loads were applied; a 200 ohm load for 1.6 second from activation, a 10 msec. 1.067 ohm pulse, and the start of 50% duty cycle high frequency switching load between values of 1.5 ohms (bottom trace) and 58 ohms (top trace). (The horizontal trace in each figure is a reference trace.)

FIGS. 3-10 are representation of an oscilloscopic recording, made with a Tektronix R5403 oscilloscope of such discharges. The dwell time on each of the load values during the cycle load causes the appearance of two voltage discharge traces. A comparison of the cyclic load voltage trace reveals useful information on the power capability and internal resistance of the battery cell.

Figure 3:
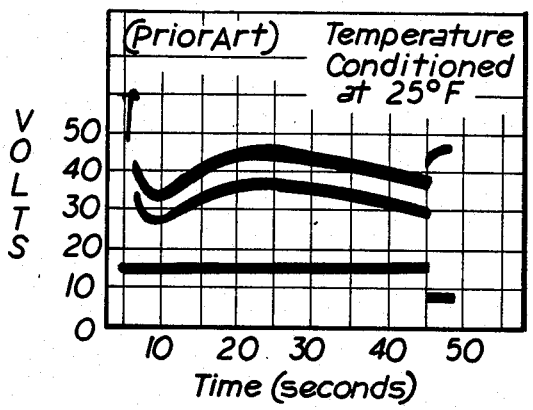
FIGS. 3 and 4 and 7 and 8 show oscilloscope tracings of batteries utilizing a screen between the anode composite material and electrolyte layer at temperatures of $-25°$ F. and $140°$ F.
Figure 4:
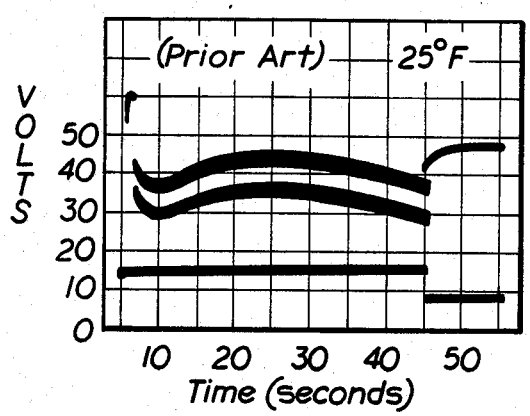
Figure 7:
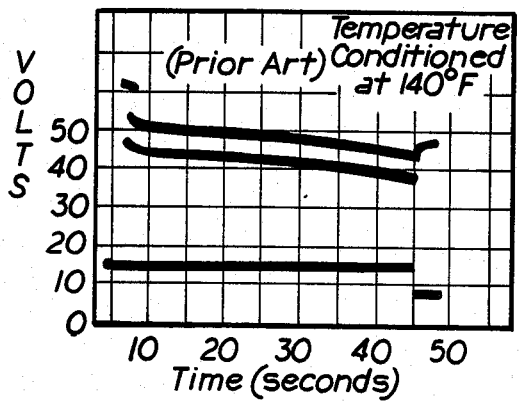
Figure 9:
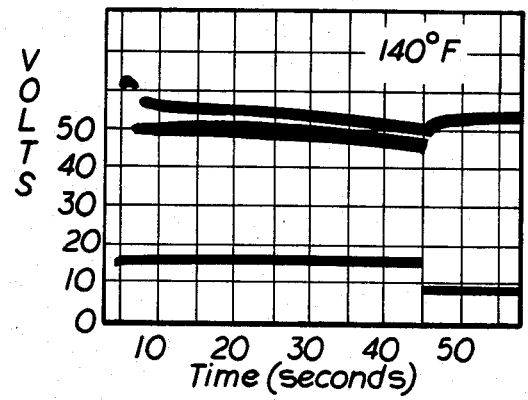
Figure 8:
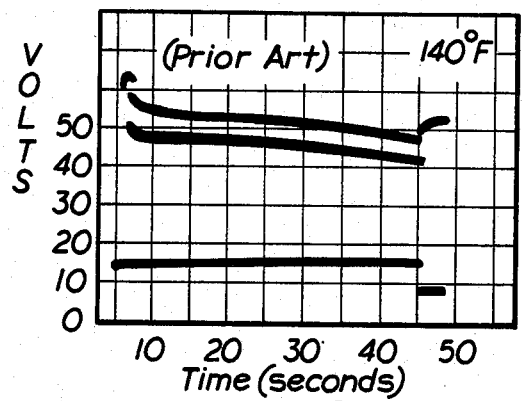
Figure 10:
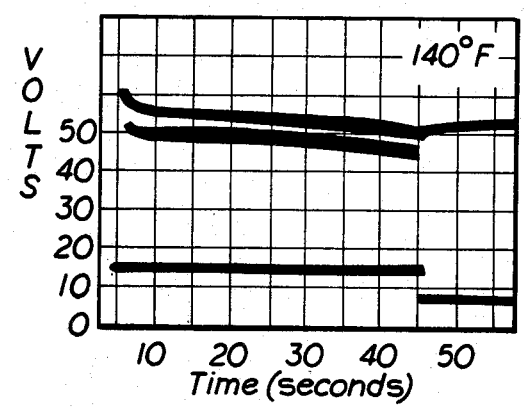

FIGS. 3 and 4 are the cold conditioned discharge traces of the prior art anode design as described in Example 1. FIGS. 7 and 8 are the comparison set which were hot conditioned. The four discharge traces show a serious high power deficiency when cold conditioned at −31.6° C. In fact, such anodes are unable to maintain a 1 to 2 $A/Cm^2$ current drain under cold conditions while those of the present invention do.

Figure 5:
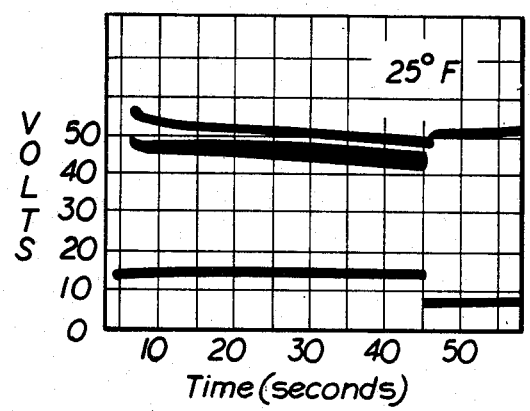
FIGS. 5 and 6 and 9 and 10 are tracings of batteries of FIG. 1 at temperatures of $-25°$ F. and $140°$ F. utilizing the anodes of the present invention showing reductions in activation noise with the similar batteries of the prior art.
Figure 6:
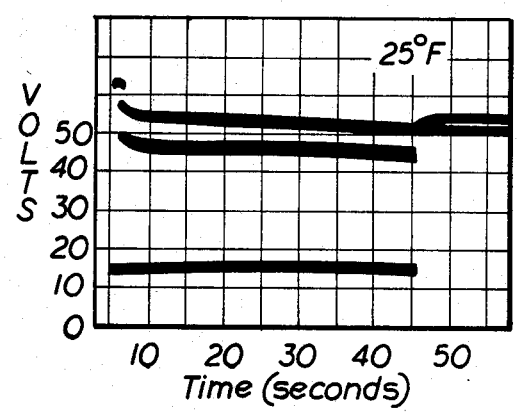

In contrast, FIGS. 5 and 6 represent cold conditioned units using anodes of Example 2 (FIG. 1). Here, both hot and cold conditioned units (FIGS. 5, 6, 9 and 10) appear nearly identical with no significant increase in the vertical spacing between the cyclic load voltage traces. This lack of change of internal resistance over extremes of temperature conditioning is extremely beneficial.

While both anode designed batteries (Example 1 and 2) eliminated the substantial noise associated with anodes designed as described in U.S. Pat. No. 4,221,849, only the anode of the present invention also maintains a low internal resistance. This lower internal resistance is appreciably lower than that of U.S. Pat. No. 4,221,849 and anode of Example 1.

Accordingly, the present invention provides a thermal battery having substantially superior contact area between electrolyte and anode as well as noise-free activation and operation. Batteries tested with the center-hole were found to have the least noise. Also, activation delay can be reduced an average of 2½ to 1 when a center-hole ignition port is used with screen 12. Also, the present invention reduces the temperature sensitivity of the battery's internal resistance.

While a presently preferred embodiment of the invention has been shown and described in particularity, it may be otherwise embodied within the scope of the appended claims.

What is claimed is:

1. In a lithium anode for use in a thermal battery having a composite material comprising lithium and a particulate metal capable of being wetted by molten lithium, but only slightly or not alloyable with said lithium, said composite anode material being positioned adjacent a metal collector element the improvement therewith comprising:
   a metal screen being positioned between and substantially co-extensive with said anode composite and the metal collector element, whereby said anode is thereby spaced apart from said element but is in electrical contact therewith and said screen is electrically conductive.

2. A thermal battery having a lithium anode as claimed in claim 1.

3. A lithium anode as claimed in claim 1 wherein said particulate matter is selected from the group consisting of iron, stainless steel, nickel and nickelchrome.

4. A lithium anode as claimed in claim 1 in which said particulate metal is present in an amount of from 70% to 85% by weight.

5. A lithium anode as set forth in claim 1 wherein said metal collector element comprises a metal cup wherein said composite anode material is postioned.

6. A lithium anode as set forth in claims 1, 2 or 5 where said lithium anode has a center-hole adapted after assembly in a stacked array for receiving a solid fuse material.

7. An improved thermal battery having the lithium anode as claimed in claim 3.

8. An improved thermal battery having the lithium anode as claimed in claim 4.

* * * * *

UNITED STATES PATENT AND TRADEMARK OFFICE
CERTIFICATE OF CORRECTION

PATENT NO. : 4,675,257

DATED : June 23, 1987

INVENTOR(S) : CLINTON S. WINCHESTER

It is certified that error appears in the above-identified patent and that said Letters Patent is hereby corrected as shown below:

Column 1, between lines 5 and 6, insert -- FIELD OF THE INVENTION  The present invention relates to an improvement in an iron-lithium anode for use in thermal batteries. --;

Column 1, line 61, after "batteries." delete "Furhter" and substitute therefor -- Further, --; and Column 1, line 65, after "temperature" delete "rage" and substitute therefor -- range --;

Signed and Sealed this

Thirty-first Day of May, 1988

Attest:

DONALD J. QUIGG

Attesting Officer

Commissioner of Patents and Trademarks